(12) United States Patent
Van Manen et al.

(10) Patent No.: US 7,558,154 B2
(45) Date of Patent: *Jul. 7, 2009

(54) METHOD OF AND APPARATUS FOR PROCESSING SEISMIC DATA

(75) Inventors: Dirk-Jan Van Manen, Oslo (NO); Johan Olof Anders Robertsson, Oslo (NO); Aslaug Strommen Melbo, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 468 days.

This patent is subject to a terminal disclaimer.

(21) Appl. No.: 10/501,271

(22) PCT Filed: Jan. 9, 2003

(86) PCT No.: PCT/GB03/00052

§ 371 (c)(1),
(2), (4) Date: May 1, 2006

(87) PCT Pub. No.: WO03/058276

PCT Pub. Date: Jul. 17, 2003

(65) Prior Publication Data
US 2007/0002688 A1    Jan. 4, 2007

(30) Foreign Application Priority Data
Jan. 11, 2002    (GB) ................................. 0200560.1

(51) Int. Cl.
*G01V 1/28* (2006.01)
(52) U.S. Cl. .......................................... 367/43; 702/17

(58) Field of Classification Search ................... 367/43; 702/17
See application file for complete search history.

(56) References Cited

U.S. PATENT DOCUMENTS 4,312,050 A * 1/1982 Lucas .......................... 367/44

(Continued)

FOREIGN PATENT DOCUMENTS

EP    0 515 188    11/1992

(Continued)

OTHER PUBLICATIONS

Edme, Pascal. Wavefield decomposition: application to real OBC data. Lithos Science Report. Jun. 2005. 7, 9-17.*

(Continued)

*Primary Examiner*—Deandra M Hughes
(74) *Attorney, Agent, or Firm*—Ari Pramudji; Liangang (Mark) Ye; Jeffrey E. Griffin

(57) ABSTRACT

A method determining a calibration filter to calibrate a first component of multi-component seismic data relative to a second component of the seismic data comprises determining the calibration filter from a portion of the seismic data that contains only events arising from critical refraction of seismic energy. The method is particularly suitable for long-off-set data, since the first arrival will be a critical refraction event and an automatic picking method may be used. The present invention also provides a wavenumber dependent calibration filter that is obtained from a calibration filter obtained from data in one offset range and another calibration filter obtained from data in another offset range.

15 Claims, 7 Drawing Sheets

U.S. PATENT DOCUMENTS

| | | | |
|---|---|---|---|
| 5,083,297 A * | 1/1992 | Ostrander | 367/36 |
| 5,793,702 A | 8/1998 | Paffenholz | |
| 6,101,448 A | 8/2000 | Ikelle et al. | |
| 6,269,310 B1 * | 7/2001 | Washbourne | 702/17 |
| 6,574,563 B1 * | 6/2003 | Nickel | 702/14 |
| 6,636,816 B1 * | 10/2003 | Dvorak et al. | 702/66 |
| 6,775,618 B1 * | 8/2004 | Robertsson et al. | 702/14 |
| 6,834,235 B2 * | 12/2004 | Muijs et al. | 702/14 |
| 7,068,568 B2 * | 6/2006 | Robertsson | 367/24 |
| 7,164,619 B2 * | 1/2007 | Robertsson et al. | 367/21 |
| 7,328,108 B2 * | 2/2008 | Robertsson et al. | 702/17 |
| 2002/0118602 A1 | 8/2002 | Sen et al. | |
| 2006/0253256 A1 * | 11/2006 | Robertsson et al. | 702/14 |

FOREIGN PATENT DOCUMENTS

| | | |
|---|---|---|
| GB | 2 333 364 | 7/1999 |
| WO | WO 97/29390 | 8/1997 |
| WO | WO 01/01170 | 1/2001 |

OTHER PUBLICATIONS

Brown et al. Arbuckle exploration: Acquisition through seismic windows of the Ouachita thrust zone. Geophysics. The Leading Edge of Exploration. Appri. 1991. pp. 29-34.*

Alridged, David. Analysis and inversion of seismic refraction traveltimes. University of British Columbia. Doctoral Theses. 1992. 221 pages.*

Brouwer et al. Shallow High-Resolution Reflection Seismics (Elsevier Handbook Geophys. Explor. vol. 19). 1998.*

PCT International Search Report for International Application No. PCT/GB03/0052, Dated Aug. 8, 2003.

Wang, et al. "Separation of P- and S- Wavefields from Wide-Angle Multicomponent OBC Data for a Basalt Model," Geophysical Prospecting, 2003, 51, pp. 233-245, XP-002248283.

Schalkwijk, et al. "Application of Two-Step Decomposition to Multicomponent Ocean-Bottom Data: Theory and Case Study," Journal of Seismic Exploration, No. 8, 1999, pp. 261-278, XP-008017686.

UK Search Report dated Oct. 4, 2002, for Application No. GB 0200560.1.

* cited by examiner

PRIOR ART

Raw pressure data with two posible minimization windows; one containing the critical refraction event (c), and one containing the primary refections (D).

Upgoing pressure when no calibration filter is applied.

Downgoing pressure when no calibration filter is applied.

Upgoing pressure when no calibration filter is applied.

Downgoing pressure when no calibration filter is applied.

METHOD OF AND APPARATUS FOR PROCESSING SEISMIC DATA

The present invention relates to a method of processing multi-component seismic data. It particularly relates to a method of processing seismic data to determine a calibration filter that calibrates one component of the seismic data relative to another component of the seismic data. The invention further relates to an apparatus for processing seismic data.

FIG. 1 is a schematic view of a seismic surveying arrangement. In this figure the surveying arrangement is a marine surveying arrangement in which seismic energy is emitted by a seismic source 1 that is suspended within a water column 2 from a towing vessel 3. When the seismic source 1 is actuated seismic energy is emitted downwards and is detected by an array of seismic receivers 4 disposed on the seafloor 5. (As used herein the term "seabed" denotes the earth's interior, and the term "seafloor" denotes the surface of the seabed.)

Many seismic surveys now use multi-component receivers that record two or more components of the seismic energy incident on the receiver. For example a 3-component (3-C) seismic receiver contains three orthogonal geophones and so can record the x-, y- and z-components of the particle motion at the receiver (the particle motion may be the particle displacement, particle velocity or particle acceleration or even, in principle, a higher derivative of the particle displacement). In a marine seismic survey a 4-component (4-C) seismic receiver can alternatively be used. A 4-C receiver contains a pressure sensor such as a hydrophone in addition to three orthogonal geophones and so can record the pressure of the water column (which is a scalar quantity) in addition to the x-, y- and z-components of the particle motion.

Many different paths exist by which seismic energy may travel from the source 1 to a receiver 4 in the seismic surveying arrangement of FIG. 1. A number of paths are indicated schematically in FIG. 1.

The path 6 shown in FIG. 1 is known as the "direct path". Seismic energy that travels along the direct path 6 travels from the source 1 to a receiver 4 essentially in a straight line without undergoing reflection at any interface.

Path 7 in FIG. 1 is an example of a "water layer multiple path". Seismic energy that follows a water layer multiple path propagates wholly within the water column 2, but undergoes one or more reflections at the surface of the water column and/or the seafloor 5 so that the seismic energy passes through the water column more than once. The water layer multiple path 7 shown in FIG. 1 involves one reflection at the seafloor 5 and one reflection at the surface of the water column, but many other water layer multiple paths exist.

The path 8 in FIG. 1 is an example of a "critical refraction path". Seismic energy that follows the path 8 propagates downwards to the seafloor 5, and penetrates into the earth's interior 10 (ie into the seabed). The seismic energy continues propagating downwardly, until it reaches a boundary 11 between two layers of the earth that have different acoustic impedance. The seismic energy undergoes critical refraction, propagates along the boundary 11, before eventually being refracted upwards towards the receiver 4. Critical refraction may also occur at the water-seabed interface, and downwardly propagating seismic energy that is refracted in this way will propagate along the water-seabed interface and will then propagate upwardly into the water column.

The path 9 shown in FIG. 1 is known as a "primary reflection path". Seismic energy that follows the primary reflection path 9 propagates downwards through the water column, is refracted at the seafloor 5, and propagates downwardly through the earth's interior. The seismic energy is refracted at the boundary 11, but is not critically refracted and so continues to propagate downwardly into the earth. It eventually undergoes reflection at a geological structure 12 that acts as a partial reflector of seismic energy, and the reflected seismic energy is, after further refraction as it passes upwardly through the boundary 11, incident on the receiver 4. The general intent of a seismic survey is to make use of the seismic energy that follows the primary reflection path in order to obtain information about the interior structure of the earth.

Seismic energy acquired at a receiver may contain upwardly and/or downwardly propagating seismic energy depending on the location of the receiver and on the event. For example seismic energy that travels along the critical refraction path 8 shown in FIG. 1 will, when it is incident (travelling upwardly) on the water-seabed interface, be partly transmitted into the water column and partially reflected back into the seabed 10. Thus, a critical refraction event will consist purely of upwardly propagating seismic energy above the seafloor 5, but will contain both upwardly and downwardly propagating seismic energy below the seafloor 5. As another example, seismic energy that travels along the direct path 6 shown in FIG. 1 will, when incident on the water-seabed interface 5, be partially transmitted into the seabed and partially reflected back into the water column. Hence, the direct event will contain both upwardly and downwardly propagating seismic energy above the seafloor, but will contain only downwardly propagating seismic energy below the seafloor. It is therefore often of interest to decompose the seismic data acquired at the receiver 4 into an up-going constituent and a down-going constituent, above or below the seafloor 5. For example, in a 4-C seismic survey it may be of interest to decompose the pressure and the vertical particle velocity recorded at the receiver into their up-going and down-going constituents above the seafloor. Various filters that enable decomposition of seismic data into up-going and down-going constituents have been proposed. One example can be found in K. M. Schalkwijk et al, "Application of Two-Step Decomposition to Multi-Component Ocean-Bottom Data: Theory and Case Study", J. Seism. Expl. Vol. 8 pp 261-278 (1999), and states that the down-going and up-going constituents of the pressure just above the seafloor may be expressed as follows:

$$P^-(f,k) = \frac{1}{2}P(f,k) - \frac{p}{2q(f,k)}Z(f,k), \quad (1)$$

$$P^+(f,k) = \frac{1}{2}P(f,k) + \frac{p}{2q(f,k)}Z(f,k),$$

where P is the pressure acquired at the receiver, $P^-$ is the up-going constituent of the pressure above the seafloor, $P^+$ is the down-going constituent of the pressure above the seafloor, f is the frequency, k is the horizontal wavenumber, Z is the vertical particle velocity component acquired at the receiver, p is the density of the water, and q is the vertical slowness in the water layer.

As can be seen, the expressions in equation (1) require two of the components of seismic data recorded at the receiver to be combined. These filters are an example where it is necessary to combine two components of the acquired seismic data. It may also be necessary to combine two or more components of the acquired seismic data in order to decompose the acquired seismic data into p-wave and s-wave (pressure-wave and shear-wave) components, or to remove water level multiple events from the seismic data.

One problem in combining different components of the seismic data acquired at a receiver is that the different components of the seismic data may not be correctly calibrated against one another. This is particularly the case where the two components that are being combined are, as in equation (1), the pressure and the vertical particle velocity. There are usually differences in coupling or impulse response between the hydrophone used to acquire the pressure and the geophone used to acquire the vertical particle velocity. It is necessary to calibrate the data for these differences before the pressure and vertical particle velocity can be combined. This may be done by developing a calibration filter that compensates for the differences in coupling and impulse response between the hydrophone and the vertical geophone.

Schalkwijk et al, and others, have suggested that the calibration problem can be addressed by assuming that one component of the seismic data has been correctly recorded, and calibrating the other component of the seismic data against the component that is assumed to be correctly recorded. In general, it is assumed that the hydrophone is well coupled, so that the pressure recording is taken to be correct. The vertical component of the particle velocity is then calibrated against the pressure to compensate for coupling and impulse response differences between the hydrophone and the vertical geophone. Schalkwijk et al therefore proposed that equation (1) above should be modified by applying a calibration filter to the vertical particle velocity. They proposed that the equation given above for the down-going constituent of the pressure above the seafloor should be modified to read as follows:

$$P^+(f, k) = \frac{1}{2}P(f, k) + a(f)\frac{p}{2q(f, k)}Z(f, k). \quad (2)$$

In equation (2) a(f) represents a frequency-dependent calibration filter. The remaining terms in equation (2) have the same meaning as in equation (1).

The method proposed by Schalkwijk et al for determining the calibration filter a(f) is to minimise the energy of the down-going pressure constituent above the seafloor for a portion of the seismic data that contains only primary reflections. Seismic energy travelling along a primary reflection path is propagating upwardly just above the seafloor at the receiver position, so that the down-going constituent of the pressure just above the seafloor should be zero for data that contains only primary reflections. Schalkwijk proposed that the calibration filter that minimises the energy of the down-going pressure in a window containing only primary reflection events can be found using a least squares method. Once the calibration filter a(f) has been determined in this way, it is applied to the entire data set for the vertical particle velocity.

The existence of various paths of seismic energy from the source to the receiver means that the data acquired at the receiver in a real seismic survey will contain events corresponding to more than one possible path. These events will occur at different times after the actuation of the seismic source 1, as different paths of seismic energy have different associated travel times. FIG. 2 is a schematic illustration of seismic data that might be acquired at the receiver 4, and it shows the amplitude of seismic energy recorded at the receiver 4 as a function of the time since the actuation of the source 1. FIG. 2 illustrates a direct event 13, corresponding to the direct path 6, a critical refraction event 14 corresponding to the critical refraction path 8, a primary event 15 corresponding to the primary reflection path 9, and a water layer multiple event 16 corresponding to the water layer multiple path 7. (In practice, data acquired at a receiver will contain a plurality of primary reflection events from different geological structures, a plurality of critical refraction events, and a plurality of water level multiple events arising from different water level multiple paths. Only one event of each type is shown in FIG. 2 for simplicity of explanation.) In order to apply the method of Schalkwijk et al to determine the calibration filter, data in a time window that contains only the primary event 15, such as the time window A shown in FIG. 2, must be selected.

The present invention provides a method of processing multi-component seismic data obtained from seismic signals propagating in a medium, the method comprising the steps of: selecting a first portion of the seismic data containing only events arising from critical refraction of seismic energy; and determining a first calibration filter from the first portion of the seismic data, the first calibration filter being to calibrate a first component of the seismic data relative to a second component of the seismic data.

The method proposed by Schalkwijk et al has the disadvantage that the time window containing only primary reflection events has to be picked manually. The primary reflection events are not the first events acquired at the receiver following actuation of the source, and so cannot be picked automatically. A further disadvantage is that in some cases, for example if the seismic source has a long signature, it may be hard to distinguish between the direct arrival and the primary reflection events, so that it may be difficult to isolate the correct events. The direct event contains downwardly propagating seismic energy so that use of a time window that inadvertently included the direct event would not give correct results for the calibration filter, since the method for determining the calibration filter assumes that the selected data contains only up-going energy. A further problem with the method of Schalkwijk et al is that in shallow water the water layer multiple events may arrive at substantially the same time as the primary reflection events, and this again makes it difficult to pick a time window that includes only the primary reflection events.

The present invention makes use of the fact that the critical refraction events consist only of up-going seismic energy just above the seafloor. Thus, selecting a time window that contains only one or more critical refraction events makes it possible to determine the calibration filter a(f) by the technique of minimising the energy of the down-going pressure just above the seafloor in that time window.

The method of the invention is particularly advantageous when applied to long offset data. As is shown in FIG. 3, as the offset (that is, the horizontal distance between the source and the receiver) increases, the arrival time of the first critical refraction event increases more slowly than does the arrival time of the direct event. For offsets greater than $O_1$ the first arrival at the receiver is not the direct event, but is the critical refraction event. That is, at long offsets the critical refraction event 14 in FIG. 2 (two critical refraction events are shown in FIG. 3) will arrive before the direct event 13 and will be the first arrival at the receiver. When the invention is applied to data having a source-receiver offset sufficiently large for the first event acquired at the receiver to be a critical refraction event, it is possible to use a time window that covers only the first event acquired at the receiver—and this makes it possible to use an automatic picking method to determine the time window. If several critical refraction events arrive at the receiver before the direct event, as for far offsets in FIG. 3 where two critical refraction events arrive before the direct event arrives, then all these critical refraction events may be included in the time window.

FIG. 4 is a schematic illustration that corresponds to FIG. 2, but illustrates the arrival times of the events at an offset that is sufficiently large such that the first arrival is a critical refraction event. In this case, the invention may be applied by selecting the time window B which includes the critical refraction event only, and minimising the energy of the downgoing pressure above the seafloor in this time window.

A further advantage of the invention is that the method may be applied to seismic data acquired in shallow waters. Although water layer multiple events in seismic data acquired in shallow water may coincide with primary reflection events, they do not coincide with critical refraction events. Choosing a time window that includes only the critical refraction event therefore ensures that the time window cannot contain water layer multiple events. The invention also overcomes the problems that arise when a seismic source having a long source signature is used.

A preferred embodiment of the invention comprises the further steps of selecting a second portion of the seismic data containing only events arising from primary reflection of seismic energy and determining a second calibration filter from the second portion of the seismic data, the second calibration filter being to calibrate the first component of the seismic data relative to the second component of the seismic data. It may comprise the further step of determining a wavenumber-dependent calibration filter from the first calibration filter and the second calibration filter.

A further problem related to the method proposed by Schalkwijk et al is that the correct calibration filter a(f) may well be dependent on the wavenumber as well as on the frequency. The calibration filter proposed by Schalkwijk, however, is dependent only on frequency and, furthermore, is derived purely from seismic data at low wavenumbers. In an embodiment of the present invention, the filter obtained from the critical refraction events is combined with a filter obtained from primary reflection events, and a wavenumber-dependent filter is obtained from the two individual filters. The wavenumber-dependent filter may be obtained by, for example, interpolation between the filter derived from the critical refraction events and the filter derived from the primary reflection events.

A second aspect of the present invention provides a method of processing multi-component seismic data obtained from seismic signals propagating in a medium, the method comprising the step of selecting a first portion of the seismic data corresponding to a first wavenumber range; determining a first calibration filter from the first portion of the seismic data; selecting a second portion of the seismic data corresponding to a second wavenumber range different from the first wavenumber range; determining a second calibration filter from the second portion of the seismic data; and determining a wavenumber-dependent calibration filter from the first calibration filter and the second calibration filter, the wavenumber-dependent calibration filter being to calibrate a first component of the seismic data relative to a second component of the seismic data.

A third aspect of the invention provides a method of processing multi-component seismic data obtained from seismic signals propagating in a medium, the method comprising the steps of: selecting a first portion of the seismic data in which the first arrival contains only upwardly propagating seismic energy above the seafloor; and determining a first calibration filter from the first portion of the seismic data, the first calibration filter being to calibrate a first component of the seismic data relative to a second component of the seismic data.

The invention may be applied to any event that is the first arrival and that contains only upgoing energy above the seafloor. For example, at far offsets the first arrival may be an event which is not a critical refraction event but which nevertheless contains only upgoing energy above the seafloor—such as, for example, a wave that was trapped in a thin subsurface layer of the seabed—and the invention may be applied to such events.

The invention may further comprise the step of calibrating the first component of the seismic data using the first calibration filter or using the wavenumber-dependent calibration filter.

A fourth aspect of the present invention provides a method of seismic surveying comprising the steps of: actuating a source of seismic energy; acquiring seismic data at a receiver spatially separated from the source; and processing the seismic data by a method as defined above.

A fifth aspect of the present invention provides an apparatus for processing multi-component seismic data to determine a calibration filter to calibrate a first component of the seismic data relative to a second component of the seismic data, the apparatus comprising: means for selecting a first portion of the seismic data containing only events arising from critical refraction of seismic energy; and means for determining a first calibration filter from the first portion of the seismic data. The apparatus may comprise a programmable data processor.

A sixth aspect of the invention provides an apparatus for processing multi-component seismic data to determine a calibration filter to calibrate a first component of the seismic data relative to a second component of the seismic data, the apparatus comprising: means for selecting a first portion of the seismic data in which the first arrival contains only upwardly propagating seismic energy above the seafloor; and means for determining a first calibration filter from the first portion of the seismic data.

A seventh aspect of the invention provides an apparatus for processing multi-component seismic data to determine a calibration filter to calibrate a first component of the seismic data relative to a second component of the seismic data, the apparatus comprising: means for selecting a first portion of the seismic data corresponding to a first wavenumber range; means for determining a first calibration filter from the first portion of the seismic data; means for selecting a second portion of the seismic data corresponding to a second wavenumber range different from the first wavenumber range; means for determining a second calibration filter from the second portion of the seismic data; and means for determining a wavenumber-dependent calibration filter from the first calibration filter and the second calibration filter.

The apparatus may comprise a programmable data processor.

An eighth aspect of the present invention provides a storage medium containing a program for an apparatus as defined above.

The invention also provides a method of determining a first calibration filter for calibrating a first component of multi-component seismic data relative to a second component of the seismic data, the method comprising the steps of: selecting a first portion of the seismic data containing only events arising from critical refraction of seismic energy; and determining the first calibration filter from the first portion of the seismic data.

The invention also provides a method of determining a wavenumber-dependent calibration filter for calibrating a first component of multi-component seismic data relative to a second component of the seismic data, the method comprising the steps of: selecting a first portion of the seismic data corresponding to a first wavenumber range; determining a first calibration filter from the first portion of the seismic data;

selecting a second portion of the seismic data corresponding to a second wavenumber range different from the first wavenumber range; determining a second calibration filter from the second portion of the seismic data; and determining a wavenumber-dependent calibration filter from the first calibration filter and the second calibration filter.

The invention also provides a method of determining a first calibration filter for calibrating a first component of multi-component seismic data relative to a second component of the seismic data, the method comprising the steps of: selecting a first portion of the seismic data in which the first arrival contains only upwardly propagating seismic energy above the seafloor; and determining a first calibration filter from the first portion of the seismic data.

Preferred embodiments of the present invention will now be described by way of illustrative example with reference to the accompanying figures in which.

Figure 1:
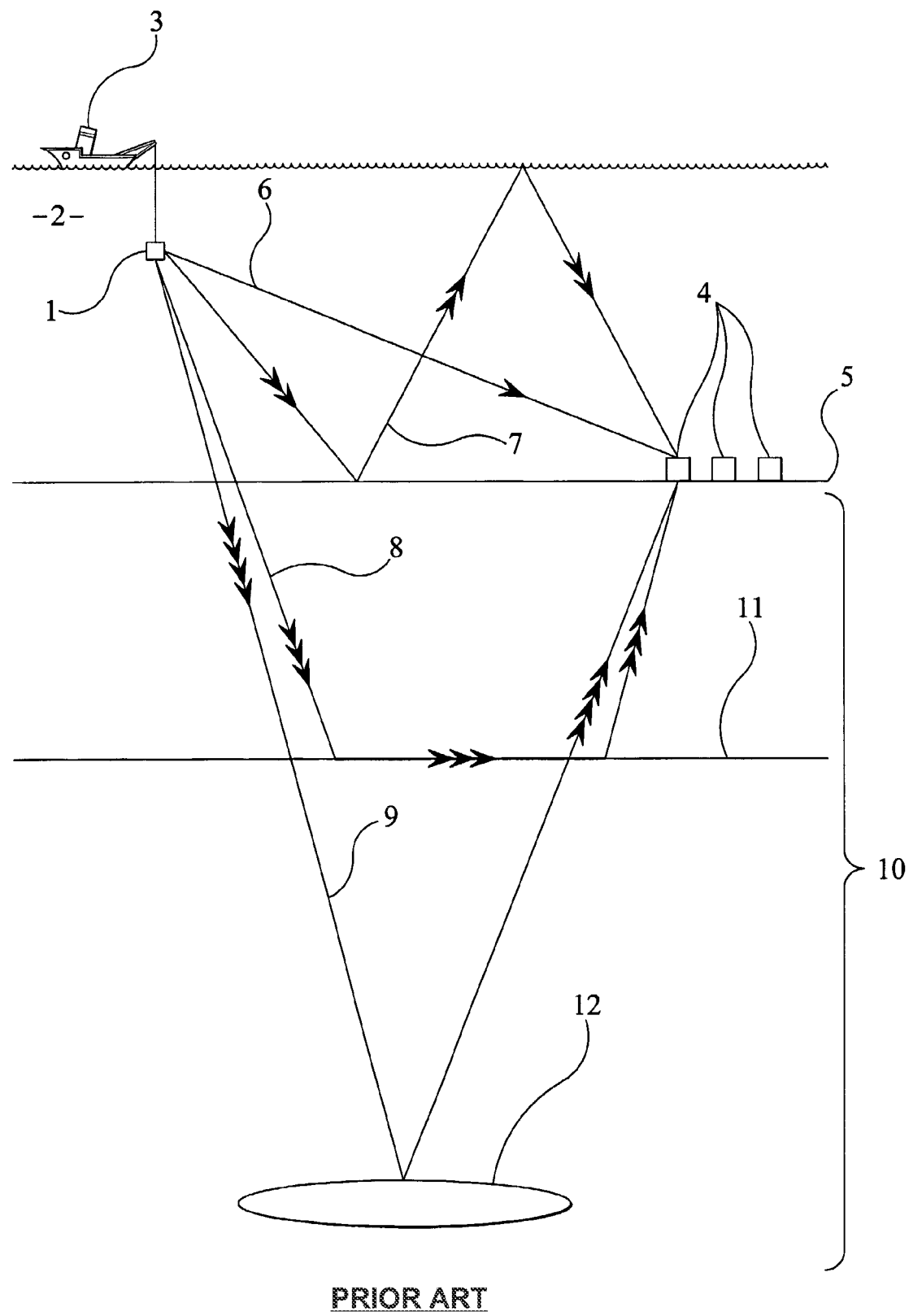
FIG. 1 is a schematic illustration of a seismic survey.
Figure 2:
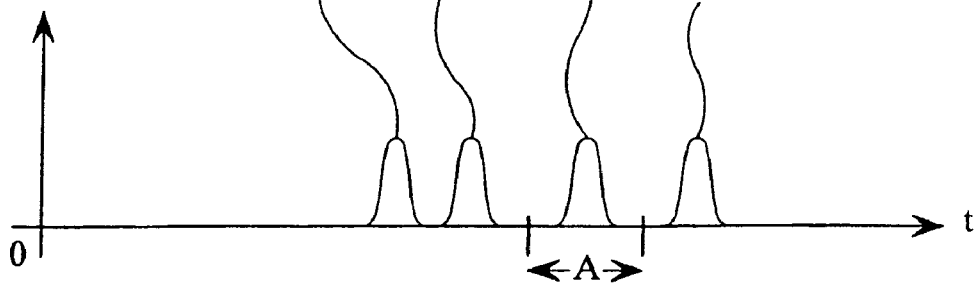
FIG. 2 is a schematic illustration of the seismic energy acquired at a receiver in the seismic survey of FIG. 1.
Figure 3:
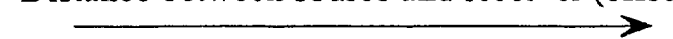
FIG. 3 is a schematic illustration of the variation of arrival time of seismic energy as a function of offset between the source and the receiver.
Figure 4:
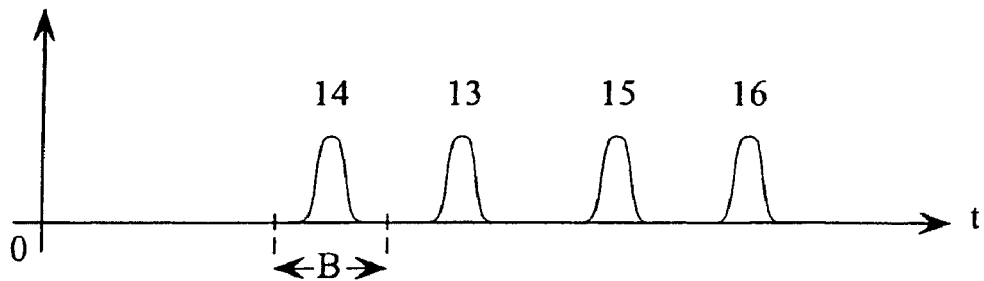
FIG. 4 is a schematic illustration of the seismic energy acquired in the seismic survey of FIG. 1 at long offsets, illustrating a method of the present invention.
Figure 5:
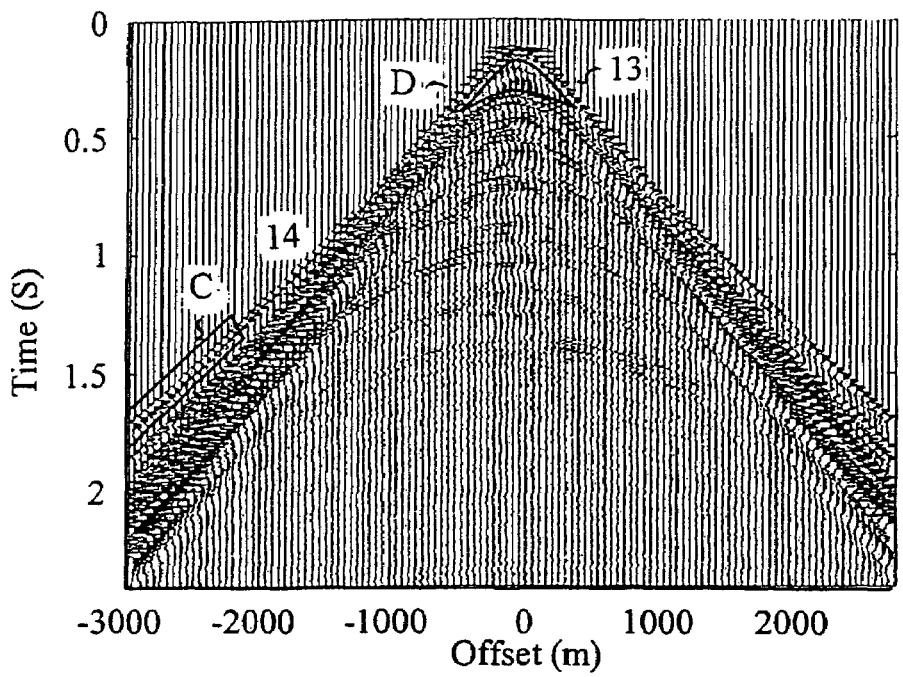
FIG. 5 is a schematic illustration of pressure recorded at a receiver in the seismic surveying arrangement of FIG. 1.

FIG. 5 illustrates typical pressure data recorded at a 4-C receiver in a seismic survey such as the survey shown in FIG. 1. The x-axis in FIG. 5 indicates the offset between the source and the receiver, and the y-axis indicates the time after actuation of the seismic source. The data are common receiver data and were acquired using a single receiver and a linear array of sources deployed with a spacing of 50 m between each pair of adjacent sources. Each trace represents the pressure acquired at the receiver when one source is actuated, with the amplitude of the acquired pressure being in the x-direction.

It should be noted that different receivers in an array may well have different coupling, different instruments responses etc, even if all the receivers are nominally identical to one another. The calibration filter required for data acquired at one receiver in a receiver array is therefore likely to be different from the calibration filter required for data acquired at another receiver in the array. The invention is therefore preferably applied to common receiver gathers and a separate calibration filter is determined for each common receiver gather.

The pressure data shown in FIG. 5 contains a large number of seismic events. The event labelled 13 is the direct wave, and it will be seen that this is the first arrival for offsets having a magnitude of up to approximately 1,000 m. The event labelled 14 is a critical refraction event, and it will be seen that this is the first arrival for offsets having a magnitude significantly greater than 1,000 m.

Figure 6:
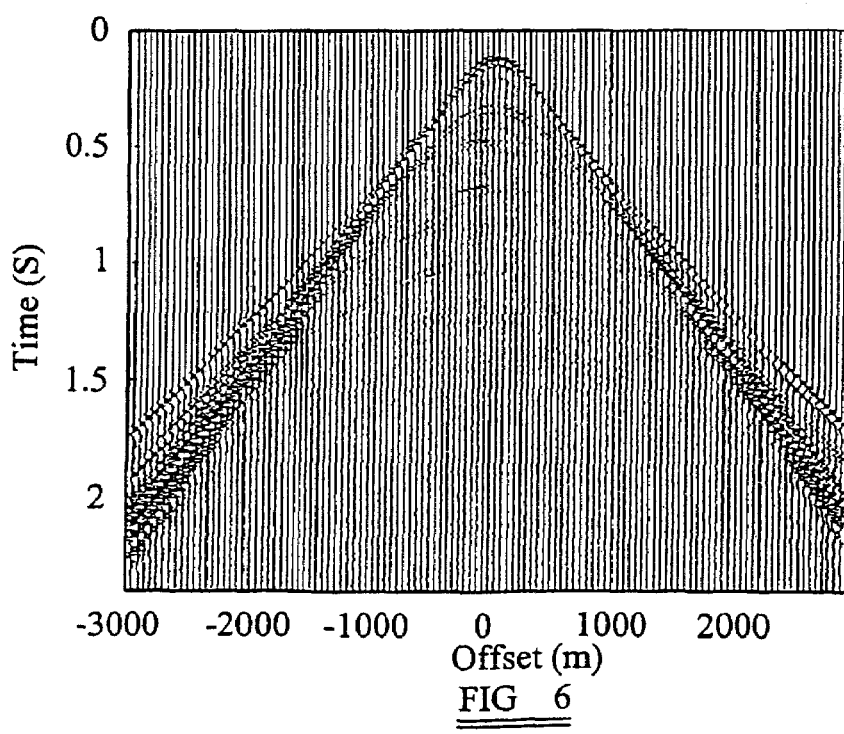
FIGS. 6 and 7 illustrate the up-going and down-going constituents of pressure above the seafloor obtained from the pressure data shown in FIG. 5 according to a prior art approach.
Figure 7:
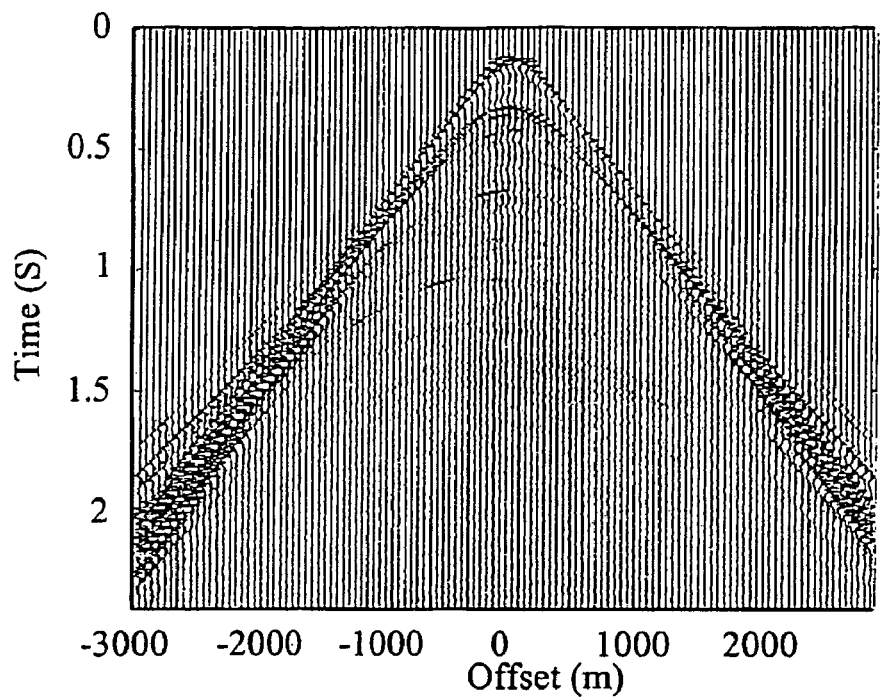

FIGS. 6 and 7 illustrate the up-going constituent above the seafloor (FIG. 6) and the down-going constituent above the seafloor (FIG. 7) of the pressure shown in FIG. 5 obtained using the filters given in equation (1) above. That is, the up-going and down-going constituent shown in FIGS. 6 and 7 were obtained on the assumption that the pressure data and the vertical particle velocity data (not illustrated) were correctly calibrated to one another. Inspection of FIGS. 6 and 7 shows that this assumption is incorrect. In particular, the critical refraction event 14 contains only up-going energy above the seafloor and so should appear only in the up-going pressure constituent and should not appear in the down-going pressure constituent. It will, however, be seen that the up-going critical refraction event has leaked through into the down-going pressure constituent shown in FIG. 7, and this indicates that the calibration is unsatisfactory.

According to the present invention, a calibration filter is determined from the critical refraction event 14. As noted above, for traces acquired at a source-receiver offset having a magnitude well above 1000 m, the critical refraction event is the first event acquired at the receiver, and is well-separated from the subsequent event. It is therefore possible for such traces to define a time-offset window that includes only the first critical refraction event, and so includes only up-going energy.

One suitable time-offset window of data is illustrated in FIG. 5, as the region C. It will be seen that this region includes traces acquired at an offset of between −3000 m to approximately −2100 m. For each trace in this offset range the region C defines a time window that includes only the first refraction event (which is the first arrival in each of the selected traces). It will be noted that the center point of the time window for a particular trace is not constant between traces but increases with increasing magnitude of offset.

The calibration filter for the vertical velocity component is then calculated on the assumption that the energy in the selected portion C of the data should contain only up-going energy. The calibration filter may be determined in any suitable way. In particular, the calibration filter $a(f)$ may be determined by finding the calibration filter that minimises the energy of the down-going pressure constituent using a least squares process, as in the method of Schalkwijk et al. Once the appropriate calibration filter $a(f)$ has been determined, revised filters for determining the up-going and down-going constituents of the pressure above the seafloor can be determined using equation (2), or in general the filter $a(f)$ may be applied to the entire gather of the vertical component data, and the calibrated vertical component data can then be used as an input to any process requiring a combination of the vertical component with any other seismic components.

Another suitable portion of data exists in the corresponding region for positive offsets in the range 2100 to 3000 m. One possible implementation of the method would be to use both these regions, by defining a second region, analogous to the region C in FIG. 5, for offsets in the range +2100 m to +3000 m and determining a second calibration filter. The two filters determined from the two windows may then be averaged. This will however not be possible for all data sets since a receiver gather does not necessarily have the same amount of positive and negative offsets, and hence a region with a clearly separated critical refraction event may be present only for either positive or negative offsets.

Figure 8:
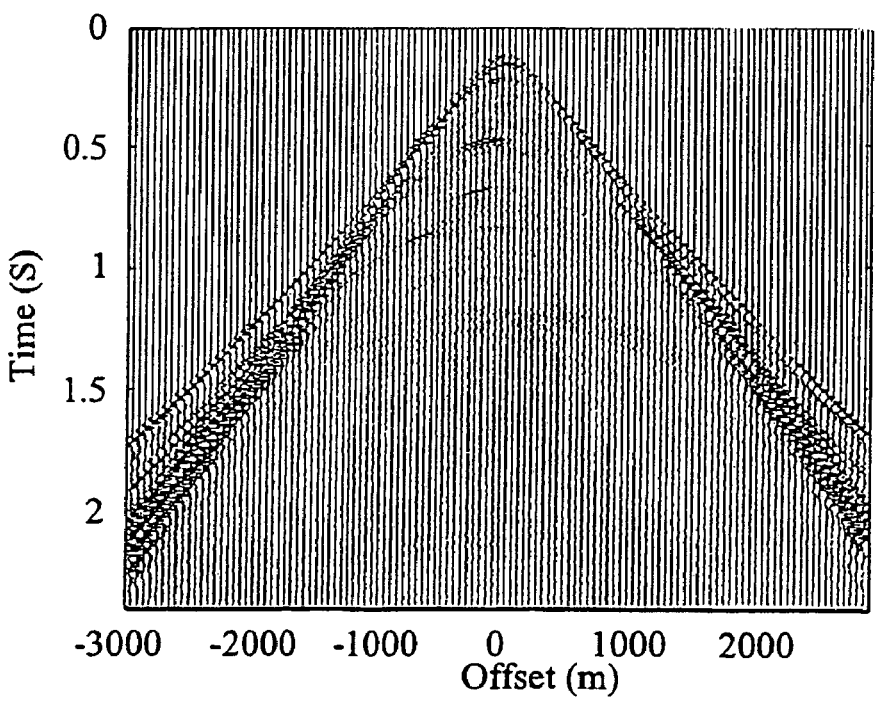
FIGS. 8 and 9 illustrate the up-going and down-going pressure constituents above the seafloor obtained from the pressure data of FIG. 5 according to a method of the present invention.
Figure 9:
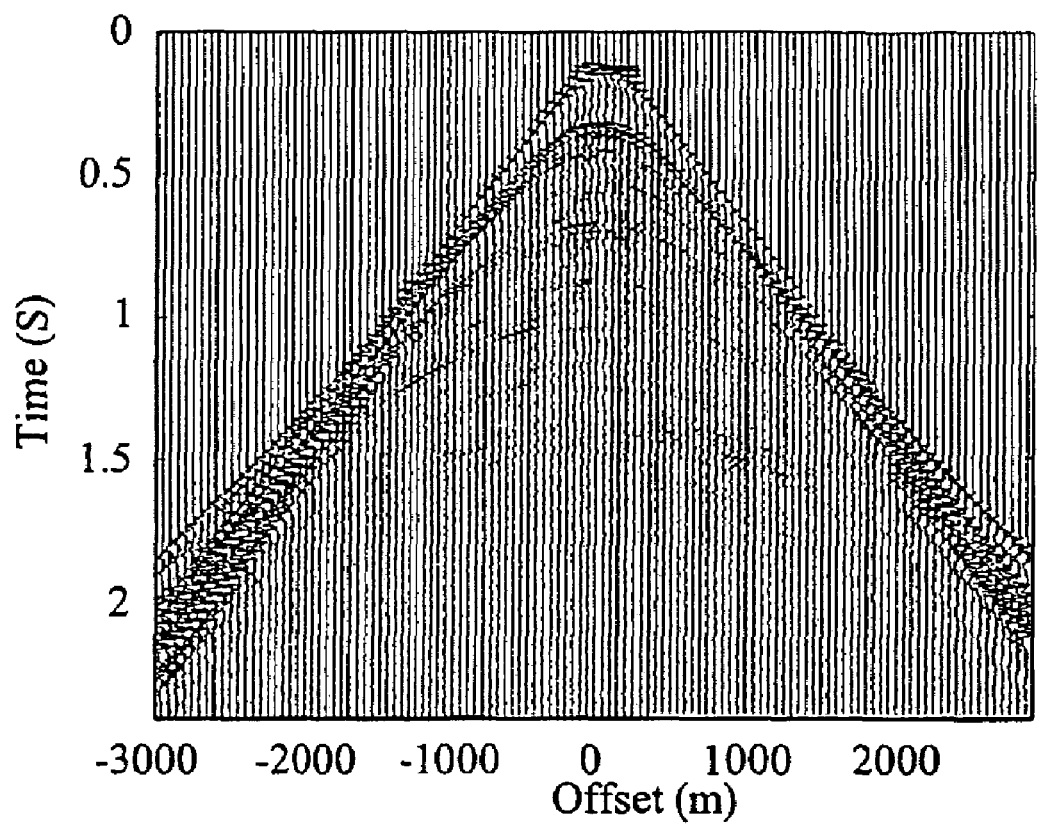

FIGS. 8 and 9 illustrate the results of decomposing the pressure data of FIG. 5 into its up-going and down-going constituents above the seafloor using filters of the type given in equation (2) above, and with the calibration filter $a(f)$ determined from the seismic data in the region C of FIG. 5. It will be noted that the critical refraction event 14 appears predominantly in the up-going pressure constituent of FIG. 8, and is almost completely absent from the down-going pressure constituent of FIG. 9. This illustrates that the decomposition of FIGS. 8 and 9 is significantly more accurate than the decomposition of FIGS. 6 and 7, since the critical refraction event is expected to occur only in the up-going pressure constituent.

It will also be noted that the primary reflection event is stronger in the up-going pressure constituent of FIG. 8 than in the up-going pressure constituent of FIG. 6. This suggests that the calibration filter found from the critical refraction event at long offsets is also applicable at low offsets.

Figure 10:
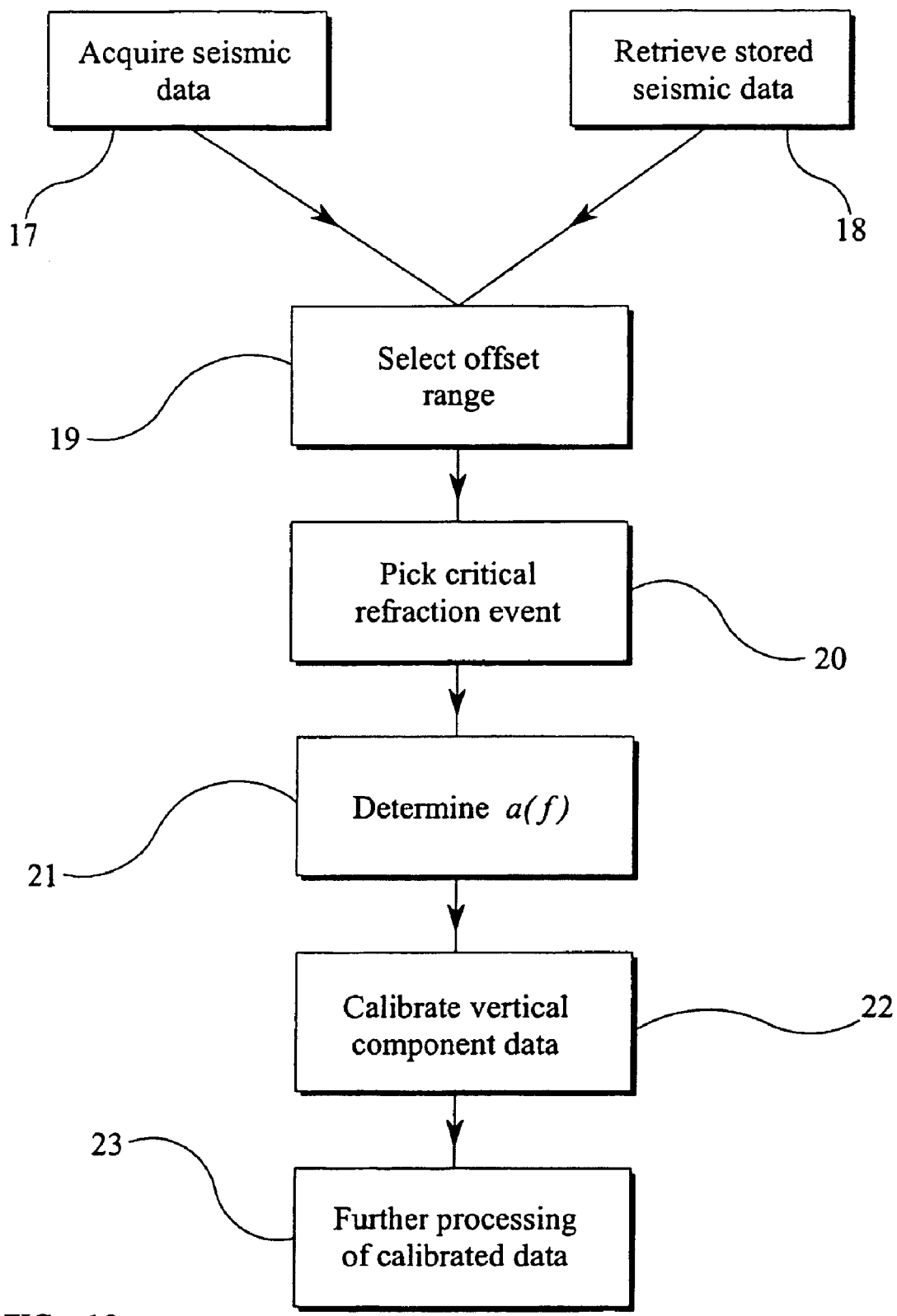
FIG. 10 is a schematic block flow diagram of a method of the present invention.

FIG. 10 is a block flow diagram illustrating one embodiment of the method of the present invention.

Initially, at step 17, seismic data is acquired. This may be, for example, acquired in a survey of the type shown in FIG. 1.

The invention may alternatively be applied to pre-existing seismic data. Step 17 may therefore be replaced by the alternative step 18 of retrieving pre-existing seismic data from storage.

At step 19 a suitable offset range is selected. In the example described above with reference to FIG. 5, step 19 consists of selecting the offset range from −3,000 m to −2100 m.

At step 20, the first arrival of seismic energy for each trace in the selected offset range is determined (this may be thought of as selecting a time window for each trace, and so defining an offset-time window). Assuming that the offset range has been selected correctly in step 19, the first arrival in each trace in the selected offset range will be a critical refraction event such as the event 14. Since the event is the first event in each trace, step 20 may be carried out using an automatic picking method, although it may alternatively be performed manually.

At step 21, a calibration filter is determined that is the best fit to the data in the selected offset range and time window. This is done by calculating the down-going pressure constituent above the seafloor from the pressure and vertical particle velocity recorded at the receiver using equation (2), and finding the calibration filter that minimises the energy in the down-going constituent of the pressure.

At step 22 the filter $a(f)$ is applied to all the desired traces of the vertical component of the seismic data acquired at step 17 or retrieved from storage at step 18.

At step 23 the calibrated vertical component data is then used as input into any process requiring a combination of several seismic components. For example, filters for determining the up-going and down-going constituents of the pressure above the seafloor may be determined, using equation (2) and the calibration filter determined at step 21.

If desired, steps 22 and 23 may be omitted. In this case the calibration filter determined at step 21 may be output for display or stored for subsequent use.

In an alternative embodiment of the invention, a wavenumber-dependent filter is determined by combining the approach of Schalkwijk et al with the present invention. In this embodiment, a calibration filter is determined from critical refraction events occurring at long offsets, as described above with reference to steps 17 to 21 of FIG. 10. A second calibration filter is then determined from traces in which it is possible to define a time-offset window that contains only primary reflection events. A calibration filter is determined for these traces in the manner described by Schalkwijk et al. A suitable region of data for obtaining this filter is indicated on FIG. 5 as region D.

The calibration filter determined from critical refraction events at long offset and the calibration filter determined from primary reflection events at low offset are then combined to produce a wavenumber-dependent calibration filter. The filters may be combined using an interpolation technique to determine the filter to be applied at a given offset.

In this embodiment, step 22 of FIG. 10 is replaced by the step of calibrating the vertical component using the wavenumber-dependent calibration filter. Alternatively steps 22 and 23 may be omitted, and the wavenumber-dependent calibration filter can be output or stored for future use.

An alternative way to obtain a wavenumber-dependent calibration filter is to compute a calibration filter for each separate trace in the offset range selected at step 19. In this alternative embodiment steps 20 and 21 are performed on each trace (or on a plurality of selected traces) in the offset range selected at step 19 so that calibration filters are determined for several different wavenumbers. Alternatively, the traces in the offset range selected at step 19 can be grouped, and a calibration filter can be determined for each group of traces, for example using a least squares method. Again, this results in calibration filters for several different wavenumbers.

Once calibration filters have been obtained for several different wavenumbers, it is possible to interpolate between and/or extrapolate from these calibration filters to obtain a wavenumber-dependent calibration filter. This method would, however, only work well for a time-offset window containing only primary reflections (i.e., the window D in FIG. 5), since the vertical slowness is constant for the refracted event. The wavenumber-dependent calibration filter may be used immediately, or may be output or stored for future use.

A further alternative method is to define time-offset windows around several refraction events of different vertical slownesses, and determine a plurality of calibration filters (one calibration filter can be obtained from data in each window). A wavenumber-dependent calibration filter can be obtained by interpolation between and/or extrapolation from these calibration filters. If desired, one or more calibration filters determined from a time-offset window containing only primary reflections can also be used in the interpolation and/or extrapolation. The wavenumber-dependent calibration filter again may be used immediately, or may be output or stored for future use.

It will be noted in FIG. 5 that the primary reflection event is obscured by other events at long offsets. It will therefore be extremely difficult to compute a reliable calibration filter at long offsets using the method of Schalkwijk et al, owing to the difficulty of determining a time window that contains only primary reflection events. Furthermore, even if a time window that contained only primary reflection events could be determined for the long offset traces in FIG. 5, this could only be done by a manual picking method and could not be automated.

The invention has been described above with reference to a calibration filter that calibrates the vertical particle motion with regard to the pressure, on the assumption that the pressure has been accurately recorded. The invention is not limited to this, however, and in principle could be used to determine a calibration filter that calibrates the pressure with regard to the vertical particle motion, on the assumption that the vertical particle motion has been accurately recorded.

Figure 11:
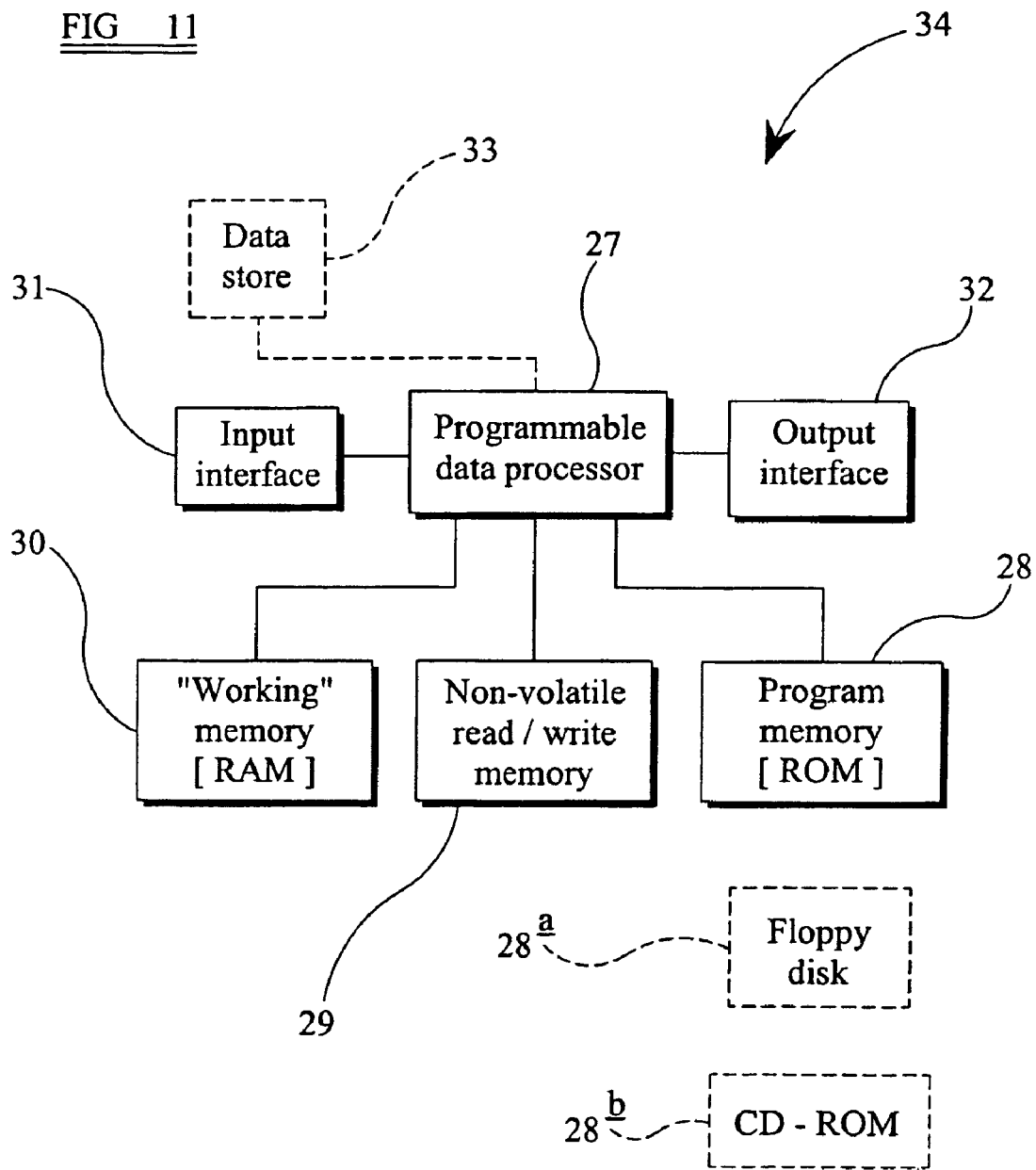
FIG. 11 is a block schematic diagram of an apparatus according to the present invention.

FIG. 11 is a schematic block diagram of an apparatus 34 according to the present invention. The apparatus is able to carry out a method according to the present invention.

The apparatus 34 comprises a programmable data processor 27 with a program memory 28, for instance in the form of a read only memory ROM, storing a program for controlling the data processor 27 to process seismic data by a method of the invention. The apparatus further comprises non-volatile read/write memory 29 for storing, for example, any data which must be retained in the absence of power supply. A "working" or "scratchpad" memory for the data processor is provided by a random access memory (RAM) 30. An input device 31 is provided, for instance for receiving user commands and data. An output device 32 is provided, for instance for displaying information relating to the progress and result of the method. The output device may be, for example, a printer, a visual display unit or an output memory.

Seismic data for processing may be supplied via the input device 31 or may optionally be provided by a machine-readable store 33.

The program for operating the apparatus and for performing a method as described hereinbefore is stored in the program memory 28, which may be embodied as a semi-conductor memory, for instance of the well-known ROM type. However, the program may be stored in any other suitable storage medium, such as magnetic data carrier 28a (such as a "floppy disc") or CD-ROM 28b.

The invention claimed is:

1. A method of processing multi-component seismic data obtained from seismic signals propagating in a medium, the method comprising the steps of: selecting a first portion of the seismic dab containing only events arising from critical refraction of seismic energy; and determining a first calibration filter from the first portion of the seismic data, the first calibration filter being to calibrate a first component of the seismic data relative to a second component of the seismic data.

2. A method as claimed in claim 1 wherein the first portion of the seismic data is data acquired with a long source-receiver offset.

3. A method as claimed in claim 1 wherein the first component is the vertical component of particle motion and the second component is pressure.

4. A method as claimed in claim 1 wherein the first component is pressure and the second component is the vertical component of particle motion.

5. A method as claimed in claim 1 wherein the step of determining the first calibration filter comprises minimising the energy immediately above the seafloor of the downgoing constituent of the second component for the selected portion of the seismic data.

6. A method as claimed in claim 1 and comprising the further steps of selecting a second portion of the seismic data containing only events arising from primary reflection of seismic energy and determining a second calibration filter from the second portion of the seismic data, the second calibration filter being to calibrates the first component of the seismic data relative to the second component of the seismic data.

7. A method as claimed in claim 6 and comprising the further step of determining a wavenumber-dependent calibration filter from the first calibration filter and the second calibration filter.

8. A method as claimed in claim 7 and comprising the further step of calibrating the first component of the seismic data using the wavenumber-dependent calibration filter.

9. A method as claimed in claim 1 and comprising the further step of calibrating the first component of the seismic data using the first calibration filter.

10. A method of seismic surveying comprising the steps of: actuating a source of seismic energy; acquiring seismic data at a receiver spatially separated from the source; and processing the seismic data by a method as defined in claim 1.

11. A method of processing multi-component seismic data obtained from seismic signals propagating in a medium, the method comprising the steps of:

selecting a first portion of the seismic data corresponding to a first wavenumber range;

determining a first calibration filter from the first portion of the seismic data;

selecting a second portion of the seismic data corresponding to a second wavenumber range different from the first wavenumber range, wherein the first wavenumber range corresponds to seismic data containing substantially only critical refraction events and the second wavenumber range corresponds to seismic data containing substantially only primary reflection events;

determining a second calibration filter from the second portion of the seismic data; and determining a wavenumber-dependent calibration filter from the first calibration filter and the second calibration filter, wherein the wavenumber-dependent calibration filter is configured to calibrate a first component of the seismic data relative to a second component of the seismic data.

12. An apparatus for processing multi-component seismic data to determine a calibration filter for calibrating a first component of the seismic data relative to a second component of the seismic data, the apparatus comprising: means for selecting a first portion of the seismic data containing only events arising Dom critical refraction of seismic energy; and means for determining a first calibration filter from the first portion of the seismic data.

13. An apparatus as claimed in claim 12 and further comprising means for calibrating the first component of the seismic data using the first calibration filter.

14. An apparatus as claimed in any of claims 12 and comprising a programmable data processor.

15. A storage medium containing a program for an apparatus as defined in claim 14.

* * * * *

UNITED STATES PATENT AND TRADEMARK OFFICE
CERTIFICATE OF CORRECTION

PATENT NO. : 7,558,154 B2 Page 1 of 1
APPLICATION NO. : 10/501271
DATED : July 7, 2009
INVENTOR(S) : Dirk-Jan Van Manen, Johan Olof Robertsson and Aslaug Strommen Melbo It is certified that error appears in the above-identified patent and that said Letters Patent is hereby corrected as shown below:

Column 11, line 26 (portion of claim 1):

seismic dab containing only events arising from critical

Is corrected to:

seismic data containing only events arising from critical

Signed and Sealed this

Seventeenth Day of November, 2009

David J. Kappos
*Director of the United States Patent and Trademark Office*